(12) United States Patent
Mehta

(10) Patent No.: US 7,029,525 B1
(45) Date of Patent: Apr. 18, 2006

(54) OPTICALLY VARIABLE WATER-BASED INKS

(75) Inventor: Rajendra Mehta, Dayton, OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 10/690,172

(22) Filed: Oct. 21, 2003

(51) Int. Cl.
- *C09D 11/02* (2006.01)
- *B41F 31/00* (2006.01)
- *B42D 15/00* (2006.01)
- *B41J 2/41* (2006.01)

(52) U.S. Cl. .................. 106/31.6; 101/491; 283/91; 347/112

(58) Field of Classification Search ............... 106/31.6, 106/31.86, 31.28; 101/491; 283/91; 347/112
See application file for complete search history.

(56) References Cited

U.S. PATENT DOCUMENTS

| | | | |
|---|---|---|---|
| 4,568,141 A | 2/1986 | Antes | |
| 4,755,229 A | 7/1988 | Armanini | |
| 4,892,385 A | 1/1990 | Webster, Jr. et al. | |
| 5,059,245 A | 10/1991 | Phillips et al. | |
| 5,084,351 A | 1/1992 | Phillips et al. | |
| 5,135,812 A | 8/1992 | Phillips et al. | |
| 5,171,363 A | 12/1992 | Phillips et al. | |
| 5,279,657 A | 1/1994 | Phillips et al. | |
| 5,281,480 A | 1/1994 | Phillips et al. | |
| 5,403,040 A | 4/1995 | Mowry, Jr. et al. | |
| 5,958,123 A * | 9/1999 | De La Fuente | 106/31.69 |
| 6,325,847 B1 | 12/2001 | Christie et al. | |
| 6,440,208 B1 | 8/2002 | Christie et al. | |
| 6,472,455 B1 | 10/2002 | Bleikolm et al. | |
| 6,521,036 B1 | 2/2003 | Bleikolm et al. | |
| 6,582,764 B1 | 6/2003 | Fuller et al. | |
| 6,730,154 B1 * | 5/2004 | Inoue et al. | 106/31.68 |
| 2003/0051634 A1 * | 3/2003 | Takahashi | 106/403 |
| 2003/0224164 A1 * | 12/2003 | Argoitia et al. | 428/403 |
| 2004/0142818 A1 * | 7/2004 | Dayman et al. | 503/201 |

* cited by examiner

*Primary Examiner*—J. A. Lorengo
*Assistant Examiner*—Veronica F. Faison
(74) *Attorney, Agent, or Firm*—Dinsmore & Shohl LLP

(57) ABSTRACT

Optically variable water-based inks, methods of providing security information, and documents are provided. The optically variable water-based inks are suitable for flexographic printing processes, and the optically variable water-based inks display a viewing angle dependent color shift between at least a first color and at least a second color. The optically variable water-based inks may be used to provide security information and to flexographically print documents.

10 Claims, No Drawings

OPTICALLY VARIABLE WATER-BASED INKS

BACKGROUND OF THE INVENTION

The present invention relates to inks having optically variable pigments and to methods of providing security information utilizing such inks.

Certain types of documents are likely to be the subject of counterfeiting attempts. Such documents include checks, travelers' checks, money orders, bankers' drafts, bearer bonds, share certificates, stamps, postal orders, and lottery tickets. Often, a counterfeiter may make a photocopy of such a document and then pass the photocopy off as the original document.

Inks having optically variable pigments have been used to provide a security feature that assists in the verification of the authenticity of documents. Optically variable pigments display a viewing angle dependent color shift. This color shift may be used to verify the authenticity of a document because it is not reproducible via color photocopying or other copying means.

Inks having optically variable pigments may be solvent-based inks that are applied using printing methods such as silk-screen printing. Such solvent-based inks may be expensive and environmentally hazardous. Additionally, the printing methods used to apply such solvent based inks may be expensive and time consuming.

Thus, there remains a need in the art for inks and methods of applying inks having optically variable pigments that are environmentally safe and inexpensive.

SUMMARY OF THE INVENTION

In accordance with an embodiment of the present invention, an ink composition is provided. The ink composition comprises about 5 to about 50 percent by weight of at least one optically variable pigment, at least one binder, and water. The at least one optically variable pigment and the at least one binder are combined with the water to form a water-based ink. The water-based ink is formulated to enable the water-based ink to be used in flexographic printing processes. The water-based ink has a viewing angle dependent color shift between at least a first color and a second color.

In accordance with another embodiment of the present invention, a method of providing security information in provided. The method comprises providing a water-based ink and printing at least a portion of a substrate with the water-based ink utilizing flexographic printing. The water-based ink comprises about 5 to about 50 percent by weight of at least one optically variable pigment, at least one binder, and water. The portion of the substrate printed with the water-based ink displays a viewing angle dependent color shift between at least a first color and a second color. The portion of the substrate printed with the water-based ink comprises security information, and the security information is not reproducible via photocopying.

In accordance with yet another embodiment of the present invention, a method of providing security information is provided. The method comprises providing a water-based ink and printing at least a portion of a substrate with the water-based ink utilizing flexographic printing. The water-based ink comprises about 10 to about 20 percent by weight of at least one optically variable pigment, wherein said at least one optically variable pigment comprises a Dynacolor® pigment; at least one binder; and about 70 to about 80 percent by weight water. The portion of the substrate printed with the water-based ink displays a viewing angle dependent color shift between at least a first color and a second color. The portion of the substrate printed with the water-based ink comprises security information, and the security information is not reproducible via a photocopier.

In accordance with another embodiment of the present invention, a document comprising a document substrate is provided. At least a portion of the document substrate is printed with a water-based ink utilizing flexographic printing. The water-based ink comprises about 5 to about 50 percent by weight of at least one optically variable pigment, at least one binder, and water. The portion of the document substrate printed with the water-based ink displays a viewing angle dependent color shift between at least a first color and a second color. The portion of the document substrate printed with the water-based ink comprises security information, and the security information is not reproducible via a photocopier.

DETAILED DESCRIPTION OF THE PREFERRED EMBODIMENTS

In accordance with an embodiment of the present invention, an ink composition is provided. The ink composition comprises at least one optically variable pigment, at least one binder, and water. The optically variable pigment, binder, and water are combined to form a water-based ink, and the water-based ink is formulated to enable its use in flexographic printing processes. When the water-based ink is printed on a document and dried, it has a color shift between at least a first color and a second color as the angle at which it is viewed is changed.

The optically variable pigment comprises between about 5 to about 50 percent by weight of the composition. In accordance with an embodiment of the present invention, the optically variable pigment comprises between about 10 to about 20 percent by weight of the composition. For purposes of defining and describing the present invention, "optically variable pigment" shall be understood as referring to a pigment that provides a change in color as the angle at which the observer looks at the surface on which the ink is printed changes. The observed color of the ink printed on the document will change from a first color to at least a second color as the orientation of the document is changed with respect to the observer's line of observation. The optically variable pigment may be any suitable optically variable pigment that can be incorporated into water-based systems.

In accordance with an embodiment of the present invention, the optically variable pigment may be a pigment comprising mica platelets coated with at least one titanium dioxide layer. The colorless titanium dioxide layer may produce a reflection color in the pigment by light interference, which is seen most effectively at the specular angle when the angle of reflection equals the angle of incidence. The mica platelets may also be coated with at least one inorganic coloring layer that absorbs some portion of the visible spectrum. For example, the inorganic coloring layer may be a layer that absorbs a color that is different than the color provided by the oxide-mica platelets and the hue of the absorbtion color may be seen at angles other than those close to the specular angle while the reflection hue is seen at angles close to the specular angle. Thus, the optically variable pigment may provide the appearance of a first color and a second color, depending upon the angle of the observer with respect to the printed surface.

For example, Dynacolor® pigments available from Engelhard Corporation, New Jersey may be used. Suitable Dynacolor® pigments include Mearlin Dynacolor BY-B that provides a blue color with a pale yellow reflection color, Mearlin Dynacolor GY that provides a green color with a pale yellow reflection color, and Mearlin Hi-Lite Super Gold that provides a white color with a pale yellow reflection color. One or more optically variable pigments may be included in the ink composition.

The at least one binder may be any suitable binder or binder system. For example, the binder system may comprise polyvinyl alcohol and at least one water soluble polymer. Any suitable water soluble polymer may be used. For example, the water soluble polymer may be polyvinyl pyrollidone, carboxymethyl cellulose, urea, methyl glucoside, and polyvinyl alcohol, and combinations thereof. Alternatively, the at least one binder may comprise at least one latex polymer such as styrene-acrylic, styrene-butadiene acrylic, and grafted styrene acrylic, and combinations thereof.

The water may be present in any suitable amount, and the at least one optically variable polymer and the at least one binder are combined with the water to form a water-based ink that is suitable for flexographic printing processes. Generally, the concentration of pigment, binder, and water is varied based on the effectiveness and desired viscosity of the ink. Inks having a viscosity between about 75 cps to about 1000 cps may be used for flexographic printing processes. For example, the water may comprise about 70 to about 80 percent by weight of the ink composition.

It will be understood that the ink composition may also have a variety of additional components. For example, the ink composition may have anti-flocculants, wetting agents, dispersing agents, anti-fungal agents, additional pigments, and dyes, and combinations thereof. In accordance with one embodiment, the ink composition may have a fluorescent dye that may be detected under a black light and may act as an additional security feature. For example, the ink composition may comprise:

Water 69.67%

Polyvinyl pyrollidone—K-30-ISP, Wayne, N.J. 1.66%

Carboxymethyl cellulose—Hercules Inc., Wilmington, Del. 3.33%

Propylene glycol—Aldrich Chemical Co., St. Louis, Mo. 0.83%

Silwet L-77—wetting agent—OSI Specialist, Danbury, Conn. 0.20%

Dynol 604—dispersing/wetting agent—Air Product & Chemical, Allentown, Pa. 0.20%

Dye fluorescent—visible under black light—Dayglow Color Corp, Cleveland, Ohio 0.41%

Polyvinyl alcohol—Celanese, Dallas, Tex. 3.60%

Amical—anti-fungal agent—Dow Chemical, Midland, Mich. 0.1%

Mearlin Dynacolor By-B 20.0%

The ink composition provides a water-based ink with homogenous pigment dispersion and minor settlement. It will be understood that various other ink compositions are suitable for use in the present invention.

In accordance with an embodiment of the present invention, a method of providing security information is provided. The method comprises providing a water-based ink and printing at least a portion of a substrate with the water-based ink utilizing flexographic printing. The water-based ink comprises the ink compositions as described herein.

The substrate may comprise any suitable substrate material and may be printed as a security document. For example, the substrate may be a paper substrate, such as papers commonly used for checks, money orders, bearer bonds, stamps, postal orders, lottery tickets, certificates, auto titles, and the like. Alternatively, the substrate may be a plastic substrate made of polyolefin, polyester, polyvinyl, polyethylene, or polypropylene materials.

The portion of the substrate printed with the water-based ink will display a viewing angle dependent color shift between at least a first color and a second color. This portion of the substrate will also provide security information. A person may verify the authenticity of the substrate by viewing the angle dependent color shift provided by the water-based ink. This security information is not reproducible via a copying method, such as photocopying, digital scanning, and the like, because the angle dependent color shift will not be reproduced via these copying methods. Generally, the portion of the substrate printed with the water-based ink will be reproducible only as a single color or as a black area.

The water-based ink may be printed on the document substrate in any suitable manner. For example, the substrate may be spot-coated with said water-based ink such that only certain areas of the substrate carry the ink. The substrate may be flood coated such that the entire substrate, or an entire face of the substrate, contains the ink. The water-based ink may be printed on the document substrate such that at least one indicia, such as a word, a picture, a logo, or the like, is printed with the water-based ink. The portions of the substrate printed with the water-based ink generally display good hardness, rub resistance, and temperature resistance. The method may also comprise printing the substrate with a laser printer after printing at least a portion of the substrate with the water-based ink, and the security information remains intact during the laser printing.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the previous specification and the following claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

It will be clear to those skilled in the art that various changes may be made without departing from the scope of the invention, which is not to be considered limited to what is described in the specification.

What is claimed is:

1. A method of providing security information, comprising:

providing a water-based ink comprising:

about 5 to about 50 percent by weight of at least one optically variable pigment;

at least one binder; and water;

printing at least a portion of a substrate with said water-based ink utilizing flexographic printing, wherein:

said portion of said substrate printed with said water-based ink displays a viewing angle dependent color shift between at least a first color and a second color;

said portion of said substrate printed with said water-based ink comprises security information; and said security information is not reproducible via photocopying; and printing said substrate utilizing laser printing subsequent to printing at least a portion of said substrate with said water-based ink wherein said security information remains intact during said laser printing.

2. The method as claimed in claim 1 wherein said at least one optically variable pigment comprises about 10 to about 20 percent by weight of said water-based ink.

3. The method as claimed in claim 1 wherein said substrate comprises a paper substrate.

4. The method as claimed in claim 1 wherein said substrate comprises a plastic substrate.

5. The method as claimed in claim 1 wherein said substrate comprises a security document.

6. The method as claimed in claim 1 wherein said water-based ink is printed on said substrate such that said substrate is spot-coated.

7. The method as claimed in claim 1 wherein said water-based ink is printed on said substrate such that said substrate is flood coated.

8. The method as claimed in claim 1 wherein said water-based ink is printed on said substrate such that at least one indicia is formed thereon.

9. The method as claimed in claim 1 wherein said substrate comprises a security document selected from a check, a money order, a certificate, an auto title, a bearer bond, a stamp, a postal order, and a lottery tickets.

10. The method as claimed in claim 1 wherein said substrate comprises a check.

* * * * *